United States Patent Office 3,450,633
Patented June 17, 1969

3,450,633
PHOSPHATE RECOVERY PROCESS
Eric Siemers, Land O'Lakes, Fla., assignor of one-third each to Ida T. Siemers, and Eric T. Siemers, both of Land O'Lakes, Fla.
No Drawing. Filed Jan. 5, 1968, Ser. No. 695,875
Int. Cl. C02 1/22, 1/20
U.S. Cl. 210—54         4 Claims

ABSTRACT OF THE DISCLOSURE

Method of recovering insoluble phosphates from colloidal aqueous suspensions by acidification to pH 5 or lower, treatment with an insoluble carbon compound (e.g. cellulose) at 100–250° F., neutralization of the suspensions, followed by filtration or centrifugation to remove the insoluble phosphate with the insoluble carbon compound.

---

This invention relates to a method of recovering phosphates from mining residues known as phosphate slimes. More particularly, this is directed to a procedure for reclaiming phosphates from colloidal suspensions of insoluble inorganic phosphates in water.

In the commercial production of phosphates and phosphorus the main commercial source of these materials is phosphate rock which is largely apatite. During the mining and processing of phosphate rock a residual material known as phosphate slime is commonly produced. It is an aqueous suspension or gel of insoluble phosphate rock or apatite in water. Because of its collodial nature which makes filtration impossible, it cannot be treated by ordinary procedures to recover the phosphates therein. To date no satisfactory methods have been developed to reclaim the residual phosphates or the water in the phosphate slimes. It is necessary to store such slimes in ponds because no other means of disposition is available.

In accordance with this invention phosphate slimes can be now treated by a procedure which permits separation of the mineral constituents from the water and recovery of each. Broadly, the process comprises slight acidification of the phosphate slimes to a pH of 5.0 or less, preferably in the range of 4.5 to 5.0, treatment of the acidic suspension at a temperature of at least 100° F. with an insoluble carbon compound, preferably an insoluble carbohydrate, followed by alkalization to bring the pH of the suspension to approximately 7. This treatment breaks up the colloidal suspension of the minerals in water and thus permits filtration and/or settling of the minerals, whereby the water as well as the mineral in the slime can be separated and recovered.

In the procedure of this invention, any of the common acids can be used to adjust the pH of the phosphate slime to a value of 5 or less. Ordinarily, sulfuric acid or muriatic acid are preferred, although phosphoric, nitric, acetic, chloroacetic, benzenesulfonic, toluenesulfonic, oxalic and formic acids are suitable.

The carbon compounds or organic materials which can be used in this invention include both the natural and synthetic polymers. For instance, polysaccharides (e.g., cellulose and esters and ethers thereof), rosin, vegetable and animal protein or combinations thereof may be used. Synthetic resins, such as vinyl, acrylic and polyester resins can be used.

Among the carbohydrates which are operative in this invention are polysaccharides, starches and cellulose. Starches such as corn, rice, wheat and potato starch are operative, even in their natural form in the plant. Natural products such as chopped sugar cane, sorghum, sugar beets, potatoes or yams, crushed corn, wheat and other cereals are useable. Cellulosic materials such as wood cellulose, cotton linters, flax, waste paper, rayon and sawdust are suitable.

The vegetable and animal proteins which are operative in this invention comprise animal and human hair, gelatin, zein, fibrinogen, collagen of muscle and cartilage of animals, casein, hemoglobin, albumen, chlorophyll and natural products containing such proteins. These and the other carbon compounds set forth above are ground before use.

Plant and animal products which contain protein and/or carbohydrates can also be used in my invention. For example, ground peas, beans or corn performed satisfactorily. Dried skim milk, hair clippings, dried leather chips, dried blood and bagasse are also operative.

The natural polymers available in residual agricultural products which are normally waste materials are also suitable. Such materials may be vegetable matter, such as corn stalks, banana stalks, rice hulls, sawdust, potatoes, beans, sugar beets or grain which has become unfit for human consumption through spoilage.

The alkaline material used to adjust pH of the solution to approximately 7 can be any of the readily available basic substances such as ammonia and aqua ammonia; alkali metal oxides, hydroxides, carbonates, bicarbonates; alkaline earth metal oxides, hydroxides, carbonates, and bicarbonates; and organic amines such as the methyl and ethyl primary, secondary and tertiary amines, alkylenepolyamines such as the ethylendiamine, diethylenetriamine and the like.

The treatment of the acidified phosphate slime with the carbon compound is carried out at a temperature in the range from 100° to 250° F., preferably at 150–200° F. The treatment is conducted for periods of time from one to three hours at 100° F. to 10 to 60 minutes at 250° F.

The invention is further disclosed by means of the following exampes which illustrate specific embodiments of the invention but are not intended to be limited thereto. In these examples, all parts are given as parts by weight and temperatures in degrees Fahrenheit.

EXAMPLE 1

A gallon of phosphate slime containing 12% of calcium phosphate in aqueous suspension was acidified to pH 5 with concentrated muriatic acid. Sawdust equal to the weight of the solids in the slime was added with good agitation and moderate heating at 160° F. for one hour. The mixture was then treated with aqua ammonia to bring the pH to 7 and filtered through a centrifuge. More than 90% of the water in the slime was recovered for reuse in phosphate operation. The filter cake contained all of the phosphates in the slime and some of the other mineral constituents. The phosphates can be separated from organic material by calcination.

EXAMPLE 2

A gallon of phosphate slime containing 18% of calcium phosphate was acidified to pH 4.6 with commerical sulfuric acid. Then finely ground rice hulls equivalent in weight to solids in the slime was added with good agitation and the mixture heated to 160° F. for two hours. The mixture was then cooled and neutralized with soda ash. The resulting suspension was filtered on a filter press and the filter cake dried and ignited to produce calcium phosphate suitable for phosphate production.

EXAMPLE 3

The procedure of Example 2 was followed using ground sugar cane in lieu of ground rice hulls. Substantially the same results were obtained.

EXAMPLE 4

The procedure of Example 2 was followed using lignite in lieu of ground rice hulls. The filter cake so produced was ignited in a furnace at 400° F. and produced calcium phosphate suitable for the production of elemental phosphorus by the electric furnace.

I claim:
1. Method of separating phosphate minerals from an aqueous suspension thereof which comprises acidifying said aqueous suspension to a pH below 5, admixing the resulting suspension with an insoluble organic material at a temperature of at least 100° F. for a period of time sufficient to coagulate the suspension, neutralizing the acidic suspension and separating the insoluble materials from the aqueous solution.
2. Method of claim 1 wherein the organic material is a cellulosic material.
3. Method of claim 1 wherein the organic material is a proteinaceous material.
4. Method of claims 2 and 3 wherein the treatment of the acidic suspension with the organic material is conducted at a temperature of at least 150° F.

References Cited

UNITED STATES PATENTS 3,403,099  9/1968  Dixon _____ 210—53

OTHER REFERENCES

Patton, V. D.: Phosphate Mining and Water Resources, Industrial Water & Wastes, May–June 1963, pp. 24–27 and 30–33 (copy in group 176).

MICHAEL E. ROGERS, *Primary Examiner.*

U.S Cl. X.R.

23—109; 252—325